United States Patent
Walker

(10) Patent No.: US 10,595,463 B2
(45) Date of Patent: Mar. 24, 2020

(54) ADJUSTABLE CONVEYOR ASSEMBLY FOR A HEADER OF AN AGRICULTURAL HARVESTER

(71) Applicant: CNH Industrial America, LLC, New Holland, PA (US)

(72) Inventor: Eric Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 179 days.

(21) Appl. No.: 15/812,440

(22) Filed: Nov. 14, 2017

(65) Prior Publication Data

US 2019/0037771 A1    Feb. 7, 2019

Related U.S. Application Data

(60) Provisional application No. 62/540,322, filed on Aug. 2, 2017.

(51) Int. Cl.
| | |
|---|---|
| *A01D 61/00* | (2006.01) |
| *A01D 61/02* | (2006.01) |
| *A01D 57/20* | (2006.01) |
| *A01D 57/06* | (2006.01) |
| *A01D 57/04* | (2006.01) |

(52) U.S. Cl.
CPC .......... *A01D 61/008* (2013.01); *A01D 57/06* (2013.01); *A01D 57/20* (2013.01); *A01D 61/02* (2013.01); *A01D 57/04* (2013.01)

(58) Field of Classification Search
CPC ...... A01D 61/008; A01D 57/06; A01D 57/20; A01D 61/02; A01D 57/04; A01D 25/048; A01D 31/00; A01D 41/10; B65G 15/30
See application file for complete search history.

(56) References Cited

U.S. PATENT DOCUMENTS

| | | |
|---|---|---|
| 357,662 A | 2/1887 | Giles |
| 991,213 A | 5/1911 | Van Kooy |
| 2,329,596 A | 9/1943 | Dalimata |
| 2,454,063 A | 11/1948 | Irvine |
| 2,724,942 A | 11/1955 | Smith |
| 3,217,473 A | 11/1965 | Lawrie |
| 3,399,517 A | 9/1968 | Magee |
| 3,638,408 A | 2/1972 | Swanson |

(Continued)

FOREIGN PATENT DOCUMENTS

| | | |
|---|---|---|
| DE | 2927297 A1 | 1/1980 |
| DE | 4028673 A1 | 3/1991 |

(Continued)

OTHER PUBLICATIONS

European Search Report for European Application No. 18185991.9 dated Dec. 7, 2018 (6 pages).

*Primary Examiner* — Arpad Fabian-Kovacs
(74) *Attorney, Agent, or Firm* — Peter K. Zacharias; Patrick M. Sheldrake

(57) ABSTRACT

A header for an agricultural harvester that includes a frame, a support bar connected to the frame and a conveyor assembly. The conveyor assembly is connected to the support bar and is adjustable in position relative to the frame about at least two degrees of freedom. The conveyor assembly includes a cam track, an endless web extending across the cam track and a plurality of tines connected to the endless web.

17 Claims, 6 Drawing Sheets

(56) References Cited

U.S. PATENT DOCUMENTS

| | | | | |
|---|---|---|---|---|
| 3,743,024 A | * | 7/1973 | Mayo | A01D 25/048 171/25 |
| 3,921,375 A | * | 11/1975 | Cetrulo, Jr. | A01D 33/00 56/327.1 |
| 3,964,550 A | * | 6/1976 | Storms | A01D 25/048 171/61 |
| 3,989,111 A | * | 11/1976 | Hobbs | A01D 29/00 171/101 |
| 4,038,809 A | * | 8/1977 | Arnould | A01D 57/20 56/124 |
| 4,353,201 A | | 10/1982 | Pierce et al. | |
| 4,495,755 A | * | 1/1985 | Johnson | A01D 41/10 198/698 |
| 4,965,993 A | * | 10/1990 | Butler | A01D 31/00 198/510.1 |
| 5,177,944 A | * | 1/1993 | Finlay | A01D 57/20 56/365 |
| 5,964,081 A | * | 10/1999 | Ingram | A01D 89/003 56/119 |
| 6,453,655 B2 | | 9/2002 | Ferraris | |
| 6,843,045 B2 | | 1/2005 | Bickel | |
| 7,805,917 B2 | * | 10/2010 | Kempf | A01D 57/20 56/14.5 |
| 7,866,136 B1 | * | 1/2011 | Hill | A01D 57/20 56/364 |
| 8,151,547 B2 | | 4/2012 | Bich et al. | |
| 2005/0022491 A1 | * | 2/2005 | Zurn | A01D 57/20 56/16.4 R |
| 2007/0000226 A1 | * | 1/2007 | Grywacheski | A01D 57/20 56/364 |
| 2011/0005186 A1 | * | 1/2011 | Wagner | A01D 45/008 56/327.1 |
| 2011/0315524 A1 | * | 12/2011 | Kidd | A01D 61/02 198/837 |
| 2016/0007532 A1 | * | 1/2016 | Borry | A01D 41/148 56/16.4 R |

FOREIGN PATENT DOCUMENTS

| | | |
|---|---|---|
| EP | 0471961 A1 | 2/1992 |
| EP | 0471961 | 3/1994 |
| GB | 1160145 A | 7/1969 |

* cited by examiner

ADJUSTABLE CONVEYOR ASSEMBLY FOR A HEADER OF AN AGRICULTURAL HARVESTER

FIELD OF THE INVENTION

The following exemplary embodiments of the present invention relate generally to a conveyor assembly for a header of a plant cutting machine (e.g., a combine harvester) and, more specifically, to a conveyor assembly that is adjustable relative to the header.

BACKGROUND OF THE INVENTION

Headers for agricultural harvesters, such as combines, that harvest crops assume a variety of configurations depending on the crop being harvested. Regardless of the crop, however, the headers include devices for conveying harvested crop to a feederhouse where the crop undergoes additional processing. One of these devices is a harvesting reel, such as a pickup reel, a draper reel or a gathering reel, which has a plurality of tines arranged around its circumference. When the harvesting reel is engaged, the harvesting reel rotates and transports cut crop to the feederhouse.

The traditional design for a harvesting reel is limited to a basic circular path that engages the crop at a point close to a cutting mechanism of the agricultural harvester. The reel position is generally acceptable for tall and loose crop but lacks performance if the crop is lodged or short. In lodged crop, the reel needs to be close to the ground and out in front of the cutting mechanism, such as a sickle, to pick up the crop whereby the sickle can cut it off. However, the harvesting reel must also be in a suitable position to be able to move the crop into the feederhouse. In traditional harvesting reel designs, the swept path of the harvesting reel is not large enough or flat enough to accomplish both of these tasks. Therefore, in the traditional design, either the cut crop is not picked up off the ground or the crop is not fed evenly into the header and thereby results in lost crop.

Thus, what is desired is a header that is adjustable such that it can be used to collect crops under varying conditions without need to use a new header specifically designed for that condition. When the disclosed exemplary embodiments are used in combination with an agricultural harvester, the exemplary embodiments overcome one or more of the disadvantages referenced above by providing a conveyor assembly that is both flexible and adjustable.

BRIEF SUMMARY OF THE INVENTION

In accordance with an exemplary embodiment, there is provided a header for an agricultural harvester comprising a frame, a support bar connected to the frame, and a conveyor assembly connected to the support bar and adjustable in position relative to the frame about at least two degrees of freedom. The conveyor assembly includes a cam track, an endless web extending across the cam track, and a plurality of tines connected to the endless web.

An aspect of the exemplary embodiment is that the header further comprises a crank arm pivotably connected to the support bar and pivotably connected to the conveyor assembly. The header further comprises a first adjuster operatively connected to the support bar for adjusting the position of the conveyor assembly relative to the frame. The header further comprises a second adjuster operatively connected to the support bar and the conveyor assembly for adjusting the position of the conveyor assembly relative to the frame.

Another aspect of the exemplary embodiment is that the cam track extends between a first sheave and a second sheave spaced from the first sheave. One of the first and second sheaves is a drive sheave and the other is a driven sheave. The distance between the first and second sheaves is selectively adjustable. The header further comprises an adjuster configured to move one of the first and second sheaves relative to the other sheave. The header further comprises an adjuster operatively connected to at least one of the first and second sheaves to expand a distance between the sheaves.

Yet another aspect of the exemplary embodiment is that the cam track includes a third sheave configured for engaging the endless web. The header further comprises an adjuster configured to move the third sheave relative to at least one of the first and second sheaves. The header further comprises a tensioner biasing one of the first and second sheaves for tensioning the endless web.

An additional aspect of the exemplary embodiment is that the endless web is a conveyor belt. The endless web further includes a plurality of slats adjustably connected to the endless web. The conveyor assembly is operatively connected to a control unit for controlling a position of the conveyor assembly.

Other features and advantages of the exemplary embodiments of the subject disclosure will be apparent from the following more detailed description.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For purposes of illustration, there are shown in the drawings exemplary embodiments. It should be understood, however, that the exemplary embodiments of the subject disclosure are not limited to the precise arrangements and instrumentalities shown.

DETAILED DESCRIPTION OF THE INVENTION

Figure 1:
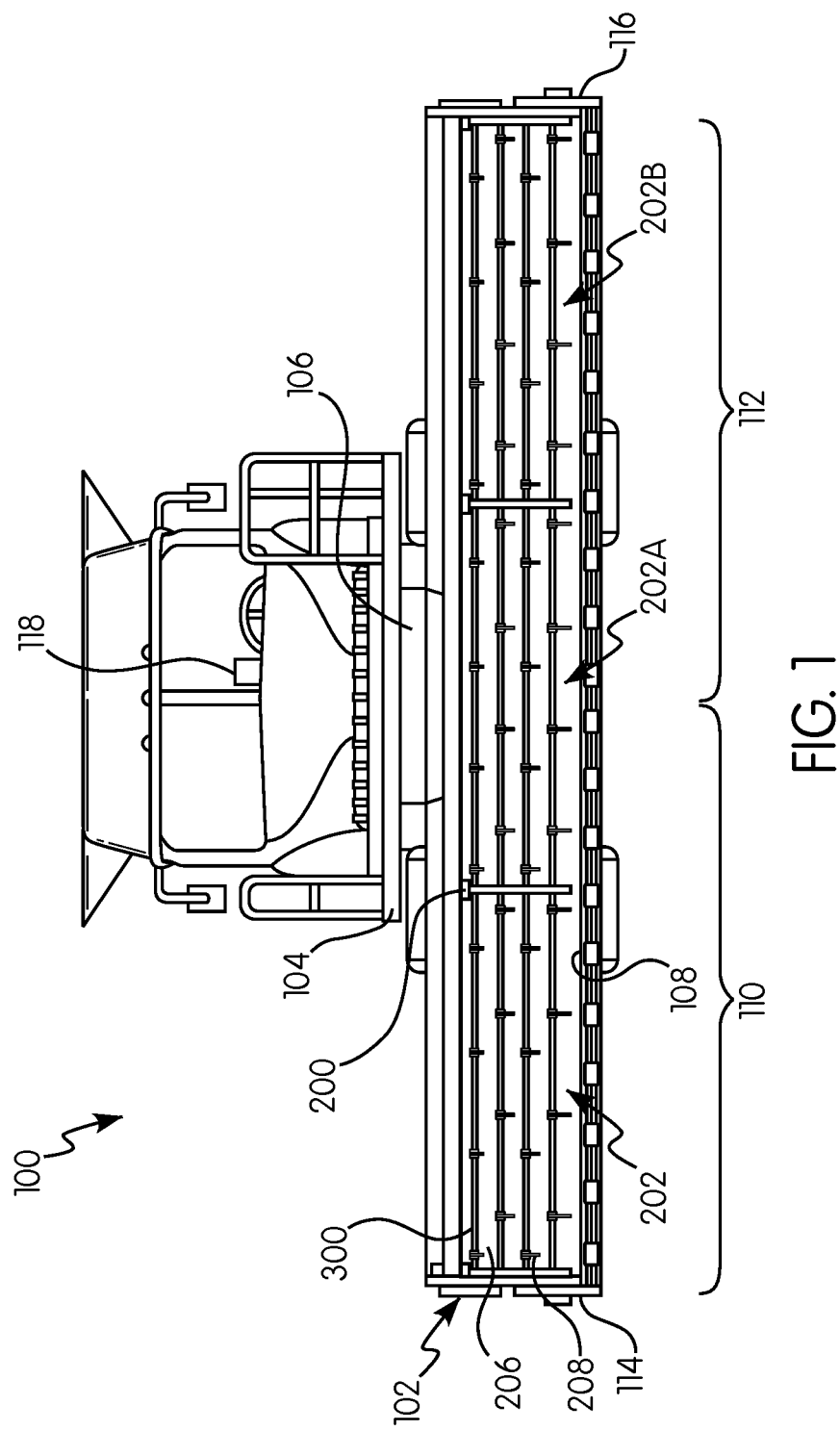
FIG. 1 is a front elevation view of an agricultural harvester including a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the present disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the present invention can be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, wherein aspects of the subject disclosure are shown, FIGS. 1-4C illustrate an agricultural harvester 100 in accordance with an exemplary embodiment. For exemplary purposes only, the agricultural harvester is illustrated as a combine harvester. The harvester 100 includes a header 102 comprising a frame 104, a support bar 200 connected to the frame 104 and a conveyor assembly 202 connected to the support bar 200 such that the conveyor assembly 202 is adjustable in position relative to the frame 104 about at least two degrees of freedom. The conveyor assembly 202 includes a cam track 204, an endless web 206 extending across the cam track 202 and a plurality of tines 208 connected to the endless web 206.

Referring now to FIG. 1, the header 102 is attached to a forward end of the harvester 100, which is configured to cut crops, including (without limitation) small grains (e.g., wheat, soybeans, grain, etc.), and to induct the cut crops into a feederhouse 106 as the harvester 100 moves forward over a crop field.

The header 102 includes a floor 108 that is supported in desired proximity to the surface of a crop field and first and second cutting assemblies 110, 112 that extend transversely along a forward edge of the floor 108 i.e., in a widthwise direction of the harvester 100. The first and second cutting assemblies 110, 112 are configured to cut crops in preparation for induction into the feederhouse 106.

In an exemplary embodiment, the header 102 includes three conveyor assemblies 202, 202A, 202B extending in series substantially parallel and above the first and second cutting assemblies 110, 112. For the purpose of the description below, only reference to one conveyor assembly 202 will be made with the understanding that the teachings with respect to one are equally applicable to the other two. However, it is appreciated that the three conveyor assemblies 202, 202A, 202B need not be identical and can be individually altered in ways known in the art. It is also appreciated that the exemplary embodiment can be practiced with any number of conveyor assemblies, including one, two, four, five, six or more.

The conveyor assembly 202 is rotatable in a direction suitable for facilitating the induction of cut crops into the feederhouse 106. The header 102 can further include an elongated, rotatable auger (not shown) and a draper belt assembly 209 which extends in close proximity to the first and second cutting assemblies 110, 112. The auger is configured to cooperate with the conveyor assembly 202 in conveying cut crops to the feederhouse 106, which is configured to convey the cut crops into the harvester 102 for threshing and cleaning. The draper belt assembly 209 is a draper belt or a series of draper belts configured to pull the cut crop towards the feederhouse 106. While the foregoing aspects of the harvester are being described with respect to the header shown, the conveyor assembly of the subject application can be applied to any other header having use for such a conveyor assembly.

The cutting assemblies 110, 112 extend along a forward edge of the floor 108, and are generally bounded by a first side edge 114 and an opposing second side edge 116, both adjacent to the floor 108. The mechanisms of the cutting assemblies are known in the art and further details regarding typical cutting mechanisms applicable to the exemplary embodiments are disclosed in U.S. Pat. No. 8,151,547, the entire disclosure of which is incorporated herein by reference for all purposes.

The frame 104 of the header 102 allows for the various components of the header 102 to be attached thereto.

Figure 2:
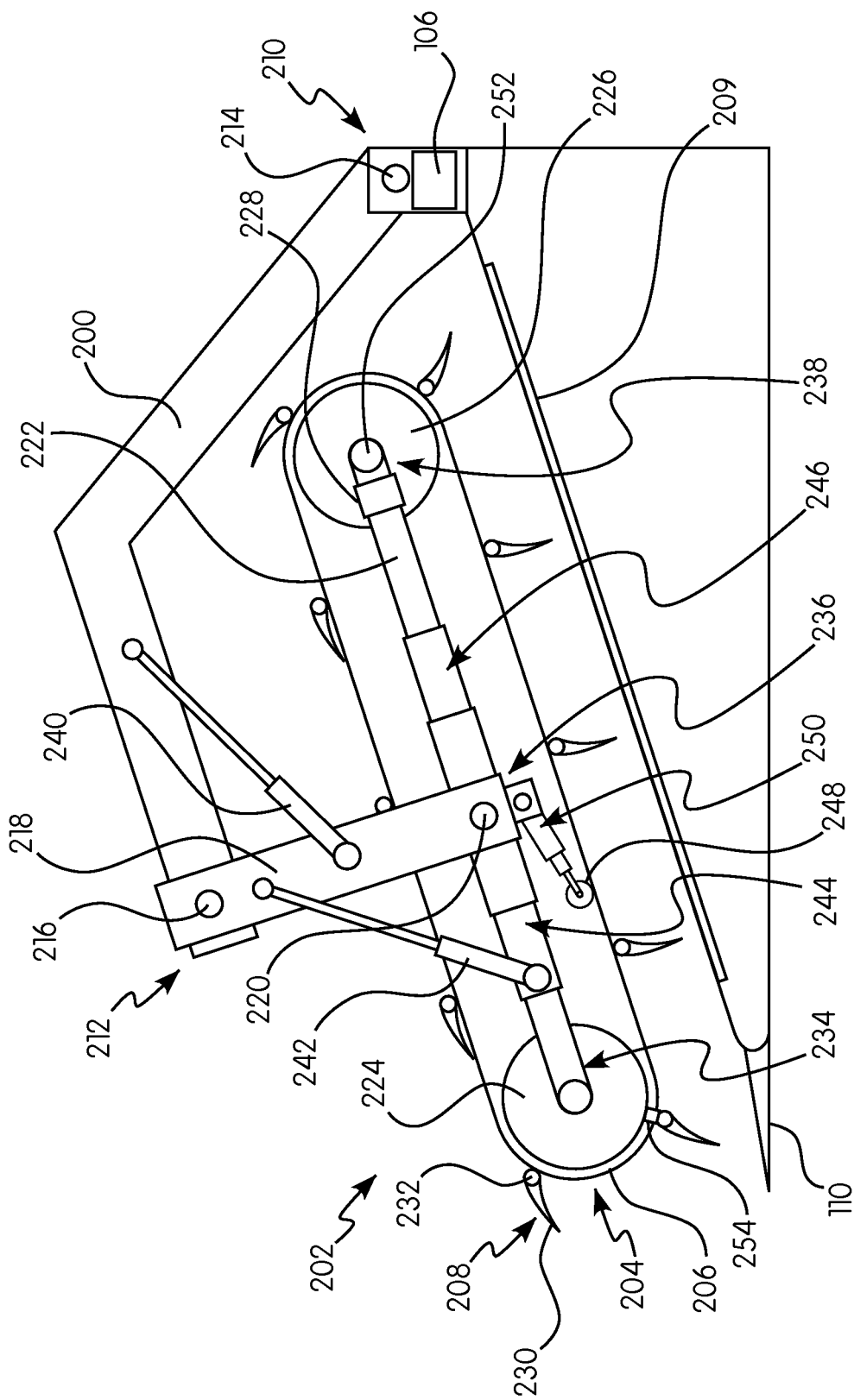
FIG. 2 is a partial side view of the header of FIG. 1 in accordance with an aspect of the exemplary embodiment.

Referring now to FIG. 2, the support bar 200 is configured substantially as shown. The support bar 200 is an elongated member having a first end 210 and a second end 212. The first end 210 includes a connecting mechanism 214 for connecting the support bar 200 to the frame 104. The connecting mechanism 214 can include, but is not limited to, welding, being integrally formed, screws, force fit connections, fasteners and so forth. The second end 212 includes a pivot connector 216, e.g. a pivot pin, for connecting with another member, such as a crank arm 218, to allow pivoting motion therebetween. Such a connection can also be accomplished using dowels and overlapping through-holes. It is appreciated that the support arm 200 can be a single elongated member extending from the frame 104 or may be a series of elongated members having a number of, for example, crank arms 218 connecting thereto.

The crank arm 218 is an elongated member and includes an end pivotably connected to the support bar 200 via the pivot connector 216 creating a pivoting joint therebetween. The crank arm 218 also includes a conveyor connector 220 on an opposite end of the crank arm 218 that connects the conveyor assembly 202 to the crank arm 218. The conveyor connector 220 can be configured similar to the pivot connector 216. In other words, the crank arm 218 is configured to have connecting mechanisms, e.g., the pivot connector 216 and the conveyor connector 220, such that the crank arm 218 is pivotably connected to the support bar 200 and pivotably connected to the conveyor assembly 202.

Figure 3:
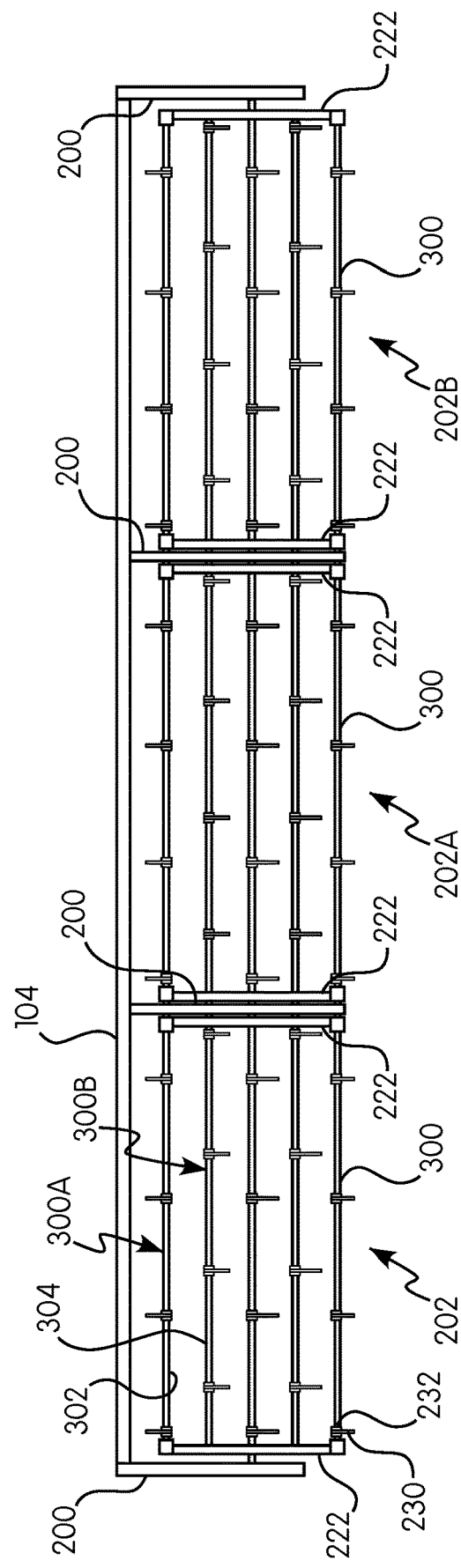
FIG. 3 is a partial top view of the header of FIG. 1 in accordance with an aspect of the exemplary embodiment.

Referring now to FIGS. 2 and 3, the conveyor assembly 202 comprises the cam track 204, the endless web 206 extending across the cam track 204, a plurality of slats 300 on the endless web 206, a plurality of tines 208 attached to the slats 300, a first sheave 224 and a second sheave 226 engaged with the endless web 206, an elongated support member 222 attached to the crank arm 218 supporting the first and second sheaves 224, 226, and a tensioner 228.

Figure 4A:
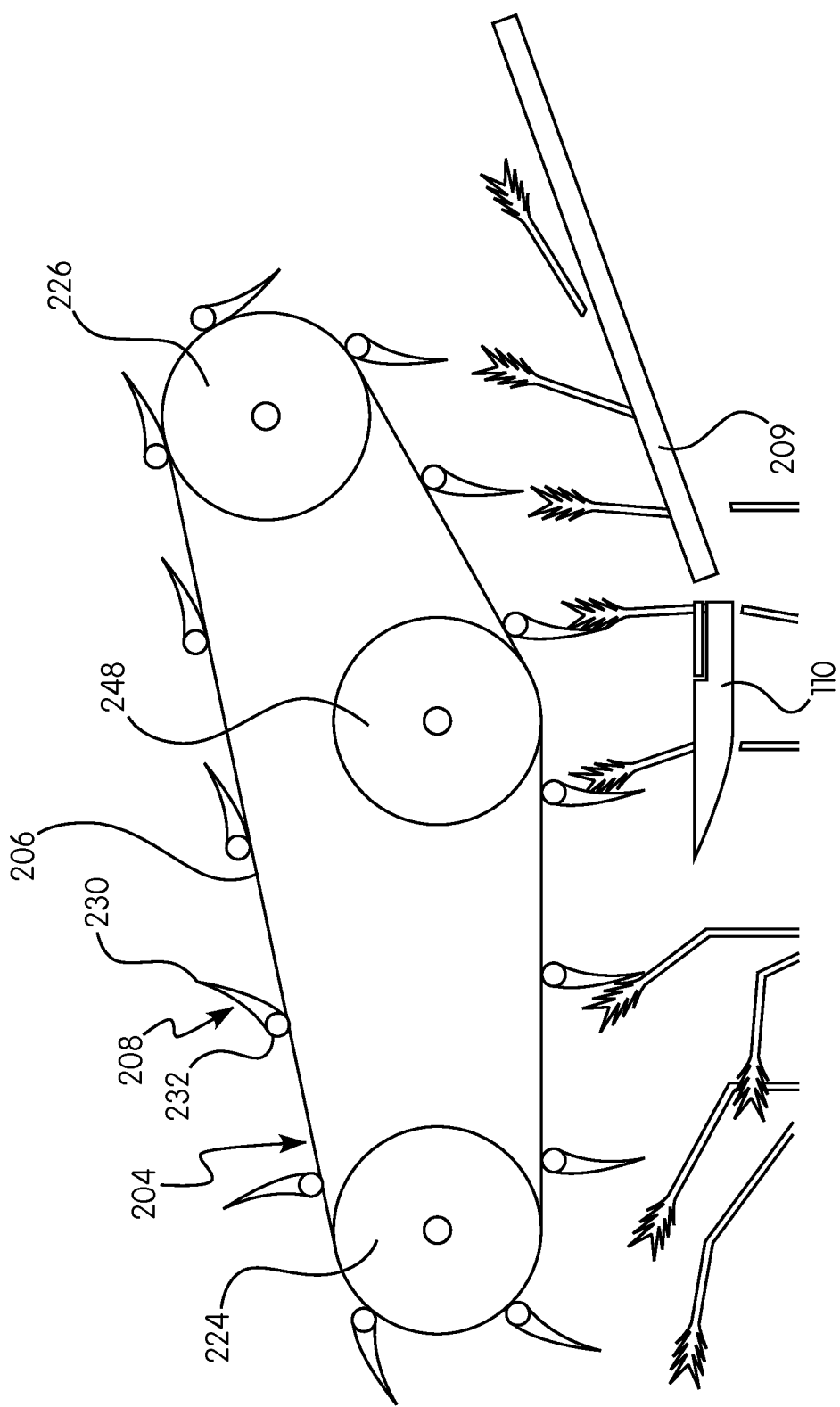
FIG. 4A is a partial side view of a conveyor assembly in a first exemplary orientation in accordance with an aspect of the exemplary embodiment.
Figure 4B:
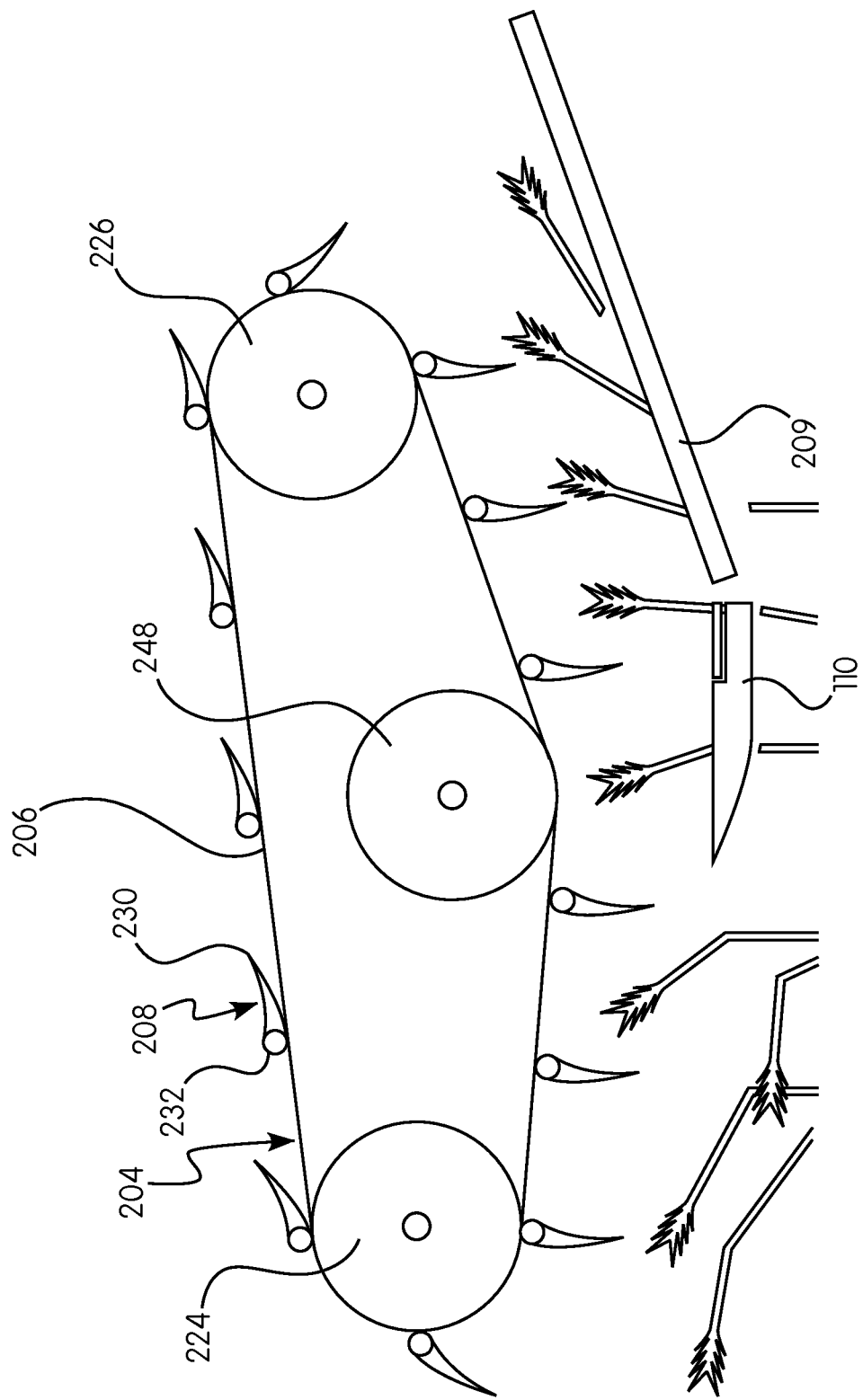
FIG. 4B is a partial side view of a conveyor assembly in a second exemplary orientation in accordance with an aspect of the exemplary embodiment.
Figure 4C:
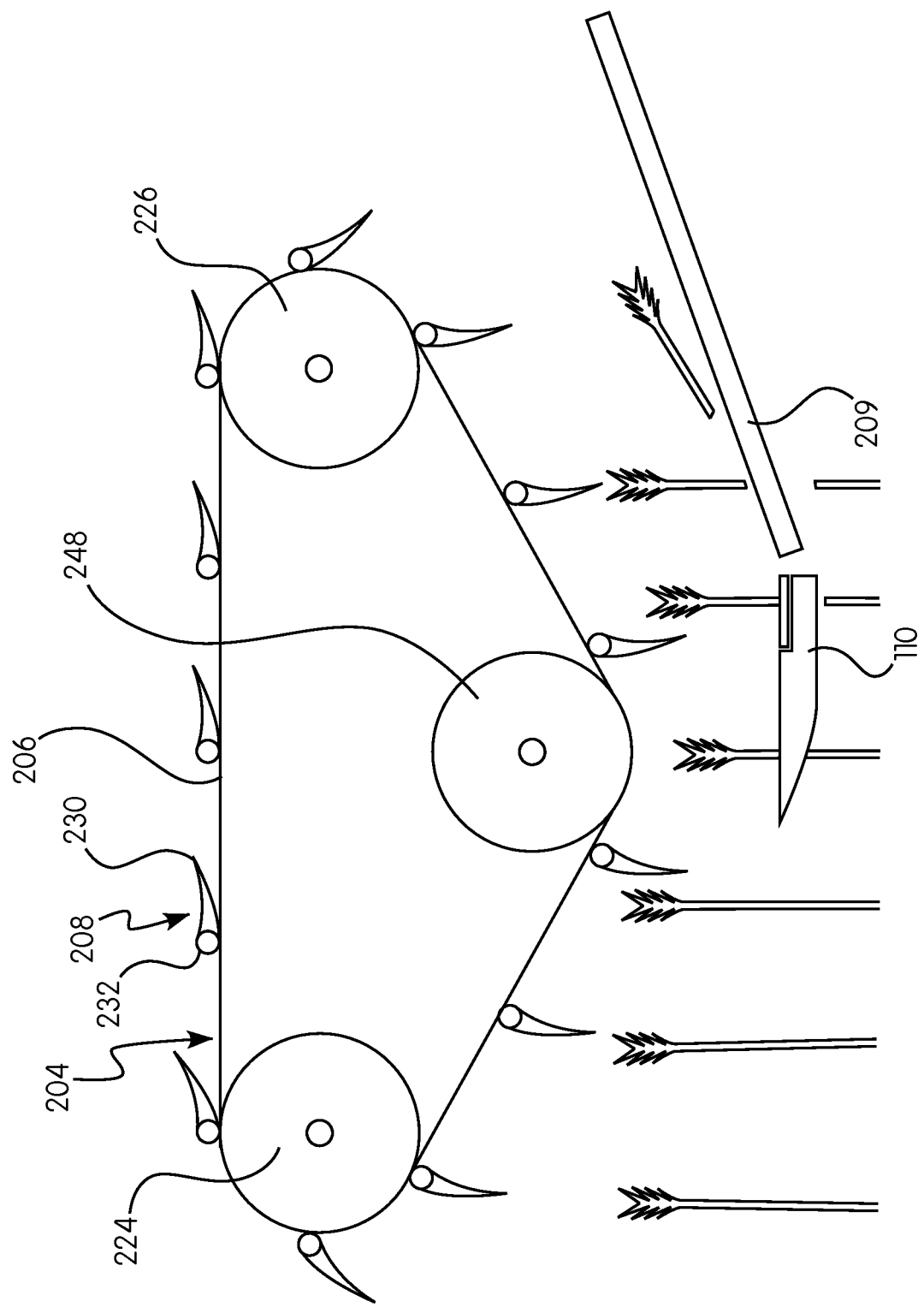
FIG. 4C is a partial side view of a conveyor assembly in a third exemplary orientation in accordance with an aspect of the exemplary embodiment.

The cam track 204 forms the path on which the endless web 206 extends across. In other words, the cam track 204 forms the structural frame of the conveyor assembly 202. In the exemplary embodiment, the cam track 204 is constructed out of the first and second sheaves 224, 226. The cam track 204 extends between the first sheave 224 and the second sheave 226 spaced from the first sheave 224. However, it is understood that the cam track 204 can also include any number of members or components such as roller pins and guides. Additionally, it is appreciated that the cam track 204 can be constructed out of a variety of materials including wood, steel, aluminum and plastic. Furthermore, the shape of the cam track 204 when viewed on a lateral side, as shown in FIG. 2, is circular or oval. However, it is appreciated that the cam track's 204 shape can take on a variety of forms, including tear-drops, depending on the configuration of the cam track 204, either when constructed or when adjusted, as described in greater detail below and as shown in FIGS. 4A-4C.

The endless web 206 is configured substantially as shown in FIG. 2. Specifically, the endless web 206 is a flexible conveyor extending around the cam track 204. In an exemplary embodiment, the endless web 206 is a conveyor belt. The endless web 206 is flexible such that it can be adjusted by expansion or contraction. The endless web 206 is expandable, or otherwise adjustable, a sufficient amount such that the endless web 206 can reach both (i) out in front of the header 102 and (ii) the feederhouse 106. The endless web 206, in one exemplary embodiment, also includes a plurality of fasteners, such as apertures, for connecting the plurality of slats 300 thereto. The endless web 206 can be constructed out of any known material that is flexible and capable of having the slats 300 affixed thereto. Such materials include, but are not limited to, chains such as feeder chains, cables, wire rope, rubber belts or other such materials generally used to form conveyor belts.

It is appreciated that while the endless web 206 is described as one piece in the conveyor assembly 202, it may instead be comprised of multiple pieces. For example, the conveyor assembly 202 may have two endless webs extending around the cam track 204 such that there is a gap between the two endless webs through which the cam track 204 or other components are visible and/or that allows for the passage of other components, such as the crank arm 218.

The plurality of slats 300 are configured substantially as shown in FIGS. 1 and 3. The slats 300 are elongated members that extend across the endless web substantially parallel to the cutting assemblies 110, 112. The slats 300 are sized to extend across the length of the endless web 206. In an exemplary embodiment, the slats 300 are configured to be able to partially overlap with other slats 300, either by design of the slats 300 or by the slats' 300 connection to the endless web 206. For example, a slat 300A can include a forward edge 302 configured to engage and/or partially slide under a back edge 304 of another slat 300B. Additionally, the slats 300 can be connected to the endless web 206 such that the forward edge 302 is tilted downward while the back edge 304 is tilted upwards.

The slats 300 include a plurality of fasteners, such as apertures, on an upper surface configured to engage and secure the plurality of tines 208 thereto. The slats 300 also include a fastener on a bottom surface configured to engage and secure to the endless web 206. The slats 300 can be attached to the endless web 206 by way of, e.g., clamps, brackets, rivets, screws, glue, being woven into the endless web 206 and so forth.

The slats 300 can also include a slat adjusting mechanism 306 for adjusting an angle of inclination of the slats 300. The slat adjusting mechanism 306 can be either electrical or mechanical. For example, the slat adjusting mechanism 306 can be configured to engage a rotatable gear. In other words, the endless web 206 includes a plurality of slats 300 adjustably connected to the endless web 206. The slats 300 can have a variety of cross-sectional sizes and shapes including, but not limited to, tear dropped, rounded, rectangular and oval. Additionally, the slats 300 may be flexible such that when the endless web 206 is flexed, the slats 300 flex as well.

The plurality of tines 208 are configured as best shown in FIG. 2. The plurality of tines 208 are connectable to the plurality of slats 300. Each tine 208 includes an elongated body 230 and a fastener 232 extending from the elongated body 230 for attaching the tine 208 to the plurality of slats 300. In an exemplary embodiment, the elongated body 230 and the fastener 232 are of unitary construction. The elongated body 230 is also configured to be arched or of a curvilinear configuration. The fastener 232 can alternatively be a rivet extending from the elongated body 230 designed to secure to the apertures on the top surface of the slats 300. The fastener 232 can also include a tine adjusting mechanism 254, similar to the slat adjusting mechanism 306 in the slats 300, at or near a bottom end of the fastener 232 such that the tines 208 can be adjusted, either by angle of inclination or rotation.

The first and second sheaves 224, 226 are configured substantially as shown in FIG. 2. In an exemplary embodiment, the first and second sheaves 224, 226 are cylindrical components having an indentation designed to engage the endless web 206 and configured to transfer rotational motion to the endless web 206. The sheaves 224, 226 include shafts that run through the sheaves 224, 226 substantially parallel to the first and second cutting assemblies 110, 112 for either providing the rotational motion or facilitating the rotational motion. It is appreciated that the first and second sheaves 224, 226 can be replaced by other rotational components such as tension rollers or gears.

One of the first and second sheaves 224, 226 is a drive sheave and the other is a driven sheave. The rotational power to drive the drive sheave is provided from the combine to the header 102 by way of, for example, a hydraulic motor. The second sheave 226, i.e., the sheave closest to the feederhouse 106, can be the driven sheave which is driven by a rotational shaft 252.

The elongated support member 222 is configured substantially as shown in FIG. 2. It has a first end 234, a central fastener 236 and a second end 238. The first end 234 is configured to engage the first sheave 224 and allow for rotational motion. The second end 238 is configured to engage the second sheave 226 and allow for rotational motion. The central fastener 236 is configured to engage the conveyor connector 220 of the crank arm 218 and create a pivoting connection such that the first and second ends 234, 238 of the elongated support member 222 can be angled up or down.

The tensioner 228 serves to exert a tensioning force against the endless web 206. In an exemplary embodiment, the tensioner 228 is connected to one of the first or second ends 234, 238 of the elongated support member 222 and operatively connected to one of the respective first or second sheaves 224, 226. By way of example and not limitation, the tensioner 228 can bias the second sheave 226 such that the tensioner 228 can push the second sheave 226 to impart tension to the endless web 206 independent of the position of the first sheave 224. For example, the tensioner 228 can include a biasing member surrounding a threaded rod anchored to the elongated support member 222. The tensioner 228 can further include a biasing member disposed between a nut and the second sheave 226. Therefore, by tightening or loosening the nut, the biasing member, e.g., a compression spring, can be compressed or released to thereby adjust the force exerted by the tensioner 228 on the endless web 206 and/or the second sheave 226. It is appreciated by those skilled in the art that the tensioner 228 may assume other forms, such as one of the adjusters 240, 242, 244, 246 described below. In other words, the header 102 comprises a tensioner 228 biasing one of the first and second sheaves 224, 226 for tensioning the endless web 206.

The header 102 also includes one or more adjusters, such as a fore/aft adjuster 240, an angle adjuster 242, a first length adjuster 244 and a second length adjuster 246 (collectively referred to as "adjusters"), and one or more additional sheaves, such as a movable third sheave 248 for adjusting the position and shape of the conveyor assembly 202 relative to the header 102.

The adjusters 240, 242 are operable to move the conveyor assembly 202 between a first position and a second position relative to the header 102. The fore/aft adjuster 240 operates to move the conveyor assembly towards and/or away from the feederhouse 106, i.e., the adjuster 240 creates fore and aft motion. The angle adjuster 242 operates to lift the tip, i.e. the first end 234, of the conveyor assembly 202 up and down.

The adjusters 240, 242 are substantially similar in design. In an exemplary embodiment, the adjusters 240, 242 are actuators such as pressurized fluid cylinders, e.g., hydraulic or pneumatic cylinders, or electronic screw jacks.

The adjusters 244, 246 are substantially similar in design. In an exemplary embodiment, the adjusters 244, 246 are directly connected to the elongated support member 222 and operate to adjust the length of the elongated support member 222. In an exemplary embodiment, the adjusters 244, 246 are formed by having the elongated support bar 222 be telescopic.

It is appreciated that the exemplary embodiment can be operated with any number of adjusters 240, 242, 244, 246 in any configuration for adjusting the position and configuration of the conveyor assembly 202. In sum, the header 102 comprises a first adjuster, e.g., the fore/aft adjuster 240, operatively connected to the support bar 200 for adjusting the position of the conveyor assembly 202 relative to the frame 104. The header 102 also comprises a second adjuster, e.g., the angle adjuster 242, operatively connected to the support bar 200 and the conveyor assembly 202 for adjusting the position of the conveyor assembly 202 relative to the frame 104. Additionally, the distance between the first and second sheaves 224, 226 is selectively adjustable, by way of an adjuster, e.g., the first length adjuster 244, configured to move one of the first and second sheaves 224, 226 relative to the other sheave, as shown in FIGS. 4A-4C. In other words, the header 102 further comprises an adjuster 224, 226 operatively connected to at least one of the first and second sheaves 224, 226 to expand a distance between the sheaves.

Referring now to FIG. 2, the cam track 204 can also include a third sheave 248 similar to the first or second sheave 224, 226 in configuration. The third sheave 248 can serve, similar to the first and second sheave 224, 226, to form the cam track 204. In other words, the cam track 204 includes a third sheave 248 configured for engaging the endless web 206. In addition, the third sheave 248 can be adjustable similarly to the first and second sheaves 224, 226 by way of an adjuster 250 similar to the adjusters 244, 246 and tensioner 228. For example, as shown in FIGS. 4A-4C, the third sheave 248 can be moved to modify the shape and reach of the endless web 206. In other words, the header 102 further comprises an adjuster 250 configured to move the third sheave 248 relative to at least one of the first and second sheaves 224, 226. Furthermore, in an exemplary embodiment, the third sheave 248 is independently adjustable from the first and second sheaves 224, 226 such that, when engaged, the third sheave 248 pushes against the endless web 206 to flex the endless web 206 into a different shape.

The header 102 is also operatively connected to a control unit 118 for controlling the position and operation of the various components of the exemplary embodiments of the subject disclosure including, but not necessarily limited to, the third sheave 248, adjusters 240, 242, 244, 246, 250, tensioner 228, rotational shaft 252, slats 300, first and second sheaves 224, 226 and so forth to control the speed of the conveyor assembly 202, the height position, the fore and aft position, the angle position and so forth. Such control units are well known in the art and do not necessitate additional discussion for the purposes of the exemplary embodiments of the subject disclosure.

With reference now to FIGS. 1-3, there is illustrated an assembled header 102 having the support bar 200 and conveyor assembly 202 in accordance with an exemplary embodiment of the subject disclosure. For convenience purposes only, the exemplary embodiment will be described in reference to only one conveyor assembly 202. However, it is understood that the header 102 can include any number of conveyor assemblies, such as conveyor assembly 202A and 202B, and the equivalent structures necessary to support the conveyor assemblies, such as multiple support arms 200, crank arms 218, elongated support members 222 and so forth.

In the exemplary embodiment, the header 102 is operatively connected to a harvester 100. The support bar 200 is connected to the header's 102 frame 104 at the first end 210 via the connecting mechanism 214. The crank arm 218 is connected to the support arm 200 at the second end 212 via the pivot connector 216. The elongated support member 222 is connected to the crank arm 218 via the conveyor connector 220. The fore/aft adjuster 240 is connected to the crank arm 218 and to the support arm 200. The angle adjuster 242 is connected to the elongated support member 222 and to the crank arm 218.

The first and second sheaves 224, 226 are connected to the elongated support member 222 at the first and second ends 234, 238 respectfully. The endless web 206 extends around the first and second sheaves 224, 226, thereby forming the basic structure of the cam track 204. Connected to the endless web 206 are the plurality of slats 300 extending substantially parallel to a longitudinal length of the cutting assemblies 110, 112. The plurality of slats 300 are connected via the slat adjusting mechanism 254 so that the slats 300 can controlled to be angled up and/or down relative to the endless web 206. The plurality of tines 208 are connected to the plurality of slats 300 via the fasteners 232 such that, when the conveyor assembly 202 is engaged and begins to rotate, the tines 208 create a cam path that is controllable to engage and release crops according to a preset path or with input from a machine operator through the control unit 118.

Additionally, in alternate exemplary embodiments, the header 102 can also include the third sheave 248 operatively connected to the endless web 206 and a tensioner 228 operatively connected to the elongated support member 222, the first or second sheaves 224, 226, and/or the endless elongated web 206. In one exemplary embodiment, the third sheave 248 is also connected to the elongated support member 222.

As shown in the exemplary embodiments of FIGS. 4A-4C, in operation, the conveyor assembly 202 rotates inwardly towards the feederhouse 106 such that cut crop is fed into the feederhouse 106. In an exemplary embodiment, when viewed from the lateral side as shown FIG. 2, the rotation is counterclockwise.

The conveyor assembly 202 rotates via rotational motion provided by the hydraulically powered rotational shaft 252, which forces the drive sheave, i.e., the second sheave 226, to rotate. Consequently, the driven sheave, i.e., the first sheave 224, and the endless web 206 also rotates.

The conveyor assembly 202 extends partially past the cutting assemblies 110, 112 so as to grasp the to-be-cut crops with the tines 208. When grasped, the harvester 100 pulls the crops closer to the header 102 wherein the cutting assemblies 110, 112 cut the stalk of the crops. The tines 208 then continue to rotate and pull the cut crop inwards towards the feederhouse 106 where it is deposited into the feederhouse 106 either by changing the inclination of the slats 300 or tines 208, or other methods known in the art such as additional components attached to the frame 104.

In the event that the cut crop cannot be efficiently collected by a first configuration of the conveyor assembly 202, the conveyor assembly 202 can be adjusted in position via the control unit 118. Specifically, the fore/aft adjuster 240 swings the conveyor assembly 202 closer to or further away from the feederhouse 106. The angle adjuster 242 adjusts the height of the first end 234 of the elongated support member 222. The first and second length adjuster 244, 246 expand or contract the distance between the first and second sheaves 224, 226. Furthermore, the angle of inclination of the plurality of slats 300 and/or tines 208 can be changed to alter the reach of the tines 208 by tilting the tines 208 forward or back, as shown in FIGS. 2 and 4A-4C. Additionally, the third sheave 248 can alter the shape of the endless web 206 by engaging and flexing the endless web 206. Finally, the tensioner 228 serves to maintain the tension of the endless web 208 such that, while the endless web 208 is being adjusted, the tension in the endless web 206 remains substantially constant.

The advantages of having an adjustable conveyor assembly are apparent. Specifically, adjusting the conveyor assembles creates an improved ability to collect cut crops with less waste. For example, if the crop is shorter than normal, the conveyor assembly can be adjusted to reach closer to the ground and further from the feederhouse. Additionally, the sectional design of the conveyor assemblies allows the user to better see the cutting assemblies and repair any potential damage.

While the subject application has been described with reference to exemplary embodiments, it will be appreciated by those skilled in the art that various changes may be made and equivalents may be substituted for elements thereof without departing from the scope of the exemplary embodiments. For example, features described in one embodiment may be incorporated into a different embodiment, such as the use of a third sheave 248. Additionally, features described in one manner may instead be accomplished by known techniques in the art, such as the methods of making a pivotable connection.

In addition, modifications may be made to adapt a particular situation or material to the teachings of the various embodiments without departing from the essential scope thereof. For example, the header can include one or more conveyor assemblies acting in tandem with one another, each identical or different from each other, to feed cut crops into the feederhouse. It is to be understood, therefore, that the exemplary embodiment not be limited to the particular aspects disclosed, but it is intended to cover modifications within the spirit and scope of the embodiments as defined by the appended claims.

I claim:

1. A header for an agricultural harvester comprising:
a frame;
a support bar connected to the frame;
a crank arm pivotably connected to the support bar;
a conveyor assembly pivotably connected to the crank arm, the conveyor assembly including:
a cam track, and
an endless web extending across the cam track;
a first adjustor operatively connecting the support bar and crank arm for moving the conveyor assembly about a first degree of freedom; and
a second adjustor operatively connecting the crank arm and conveyor assembly for moving the conveyor assembly about a second degree of freedom.

2. The header of claim 1, wherein the crank arm includes a first pivot connector for pivotably connecting to the support bar.

3. The header of claim 1, wherein the crank arm includes a second pivot connector for pivotably connecting to the conveyor assembly.

4. The header of claim 1, wherein the crank arm is positioned above the conveyor assembly.

5. The header of claim 1, wherein the support bar is connected to the frame at a position between lateral ends of the frame.

6. The header of claim 1, wherein the support bar is connected to the frame at a middle portion of the frame.

7. The header of claim 1, wherein the support bar extends over the conveyor assembly.

8. The header of claim 1, wherein conveyor assembly is operatively connected to a control unit for controlling a position of the conveyor assembly.

9. The header of claim 1, wherein the cam track extends between a first sheave and a second sheave spaced from the first sheave.

10. The header of claim 9, wherein the conveyor assembly further comprises an adjuster operatively connected to one of the first and second sheaves for moving the one of the first and second sheaves relative to the other sheave.

11. The header of claim 9, wherein the cam track includes a third sheave engaging the endless web.

12. The header of claim 11, wherein the third sheave is between the first and second sheaves.

13. The header of claim 11, further comprising an adjuster operatively connected to the third sheave for moving the third sheave relative to at least one of the first and second sheaves.

14. The header of claim 9, further comprising a tensioner biasing one of the first and second sheaves for tensioning the endless web.

15. The header of claim 9, wherein a distance between the first and second sheaves is selectively adjustable.

16. The header of claim 1, wherein the endless web is a conveyor belt.

17. The header of claim 1, wherein the endless web further includes a plurality of slats adjustably connected to the endless web.

* * * * *